United States Patent
Hariharan et al.

(10) Patent No.: US 11,259,192 B2
(45) Date of Patent: *Feb. 22, 2022

(54) ULTRA-LOW LATENCY AUDIO OVER BLUETOOTH

(71) Applicant: Apple Inc., Cupertino, CA (US)

(72) Inventors: Sriram Hariharan, San Jose, CA (US); Alon Paycher, Beit Hananya (IL); Ran Irony, Hod Hasharon (IL); Sreeraman Anantharaman, Los Altos, CA (US); Robert D. Silfvast, Belmont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/146,138

(22) Filed: Sep. 28, 2018

(65) Prior Publication Data

US 2019/0104423 A1 Apr. 4, 2019

Related U.S. Application Data

(60) Provisional application No. 62/565,416, filed on Sep. 29, 2017.

(51) Int. Cl.
*H04W 24/02* (2009.01)
*H04L 43/0823* (2022.01)
*H04R 3/12* (2006.01)
*H04L 5/00* (2006.01)
*H04W 84/12* (2009.01)

(52) U.S. Cl.
CPC ........... *H04W 24/02* (2013.01); *H04L 5/0055* (2013.01); *H04L 43/0847* (2013.01); *H04R 3/12* (2013.01); *H04R 2420/07* (2013.01); *H04W 84/12* (2013.01)

(58) Field of Classification Search
None
See application file for complete search history.

(56) References Cited

U.S. PATENT DOCUMENTS

| 8,306,060 | B2 | 11/2012 | Ngo et al. |
| 8,503,317 | B2 | 8/2013 | Kim et al. |
| 8,768,252 | B2 | 7/2014 | Watson et al. |
| 9,819,705 | B2 | 11/2017 | Pedersen et al. |
| 10,136,429 | B2 | 11/2018 | Lee et al. |

(Continued)

OTHER PUBLICATIONS

U.S. Appl. No. 16/146,571, Non-Final Office Action dated Jan. 27, 2020, pp. 1-15.

(Continued)

*Primary Examiner* — James P Duffy
(74) *Attorney, Agent, or Firm* — Dickinson Wright RLLP (57) ABSTRACT

Methods and apparatus for communicating audio packets with ultra-low latency at high data rates from an audio source device to one or more audio output devices over a wireless personal area network (WPAN) connection, such as via a Bluetooth connection. Latency is reduced by using time-efficient audio coding and decoding, limited retransmissions, reduced time and frequency of acknowledgements, and by combining Bluetooth Classic (BTC) packets for downlink audio and downlink control with Bluetooth Low Energy (BTLE) packets for uplink control, uplink acknowledgements, and inter-device wireless communication. The number of retransmissions and packet concealments per frame cycle can be limited to an upper threshold number to satisfy a low latency requirement.

20 Claims, 6 Drawing Sheets

(56) References Cited

U.S. PATENT DOCUMENTS

| | | |
|---|---|---|
| 2006/0133302 A1 | 6/2006 | Yoon et al. |
| 2007/0110074 A1* | 5/2007 | Bradley ............ H04L 29/06027 |
| | | 370/395.51 |
| 2007/0165593 A1 | 7/2007 | Hundal et al. |
| 2009/0017879 A1 | 1/2009 | Tsfaty et al. |
| 2014/0348327 A1 | 11/2014 | Linde et al. |
| 2015/0312858 A1 | 10/2015 | Kearai |
| 2015/0364143 A1 | 12/2015 | Abildgren et al. |
| 2016/0191181 A1 | 6/2016 | Bailey |
| 2016/0295516 A1 | 10/2016 | Su et al. |
| 2016/0338045 A1 | 11/2016 | Hirsch et al. |
| 2016/0360526 A1 | 12/2016 | Lehmann et al. |
| 2019/0104424 A1* | 4/2019 | Hariharan ................ H04R 3/12 |

* cited by examiner

ULTRA-LOW LATENCY AUDIO OVER BLUETOOTH

CROSS-REFERENCE TO RELATED APPLICATIONS

The present application claims the benefit of U.S. Provisional Application No. 62/565,416, entitled "ULTRA-LOW LATENCY AUDIO OVER BLUETOOTH," filed Sep. 29, 2017, the content of which is incorporated by reference herein in its entirety for all purposes.

FIELD

The described embodiments set forth techniques for wirelessly communicating audio packets with ultra-low latency for devices in a wireless personal area network (WPAN), including Bluetooth® (BT) connections between an audio source device and one or more audio output devices.

BACKGROUND

Wireless communication capabilities continue to be added to a broad array of devices, including accessory devices configurable to pair with source devices. For example, wireless audio output devices, such as a wireless headset or wireless ear buds, can connect to an audio source device, such as a media streaming capable smart phone, tablet, portable computer, wearable device or other wireless-capable computing device, to receive an audio stream via a WPAN connection, such as via a Bluetooth connection. A wireless headset can include a wired connection between two speakers, e.g., for reproduction of right and left audio channels, while wireless ear buds can communicate with each other via a separate WPAN connection, such as an additional Bluetooth connection. For wireless ear buds connected to an audio source device, the two Bluetooth connections can form a scatternet in which the audio source device can communicate with one or both of the wireless ear buds via a first Bluetooth connection, and the wireless ear buds can communicate with each other via a second Bluetooth connection. Audio reproduction for stored or streaming media playback, e.g., music streaming or video playback, can accommodate substantial delay, e.g., through buffering mechanisms.

SUMMARY

The latency associated with some audio must be significantly reduced compared to traditional performance levels in order to achieve an acceptable user experience. For example, audio reproduction associated with physical gestures, such as keystroke clicks, instrument sounds, or gaming applications, can require very-low or ultra-low latency to avoid unacceptable delay. Similarly, real-time audio playback also may require very-low or ultra-low latency. For ultra-low latency audio, retransmission of audio packets, e.g., due to interference in a shared radio frequency (RF) band, such as the 2.4 GHz industrial, scientific, and medical (ISM) band, de-jitter buffering, and complex encoding/decoding, can affect the performance of real-time or near real-time audio reproduction and impact negatively user experience.

The embodiments described herein relate to communicating audio packets with ultra-low latency, e.g., at high data rates, from an audio source device to one or more audio output devices over a wireless personal area network (WPAN) connection, such as via a Bluetooth connection. Latency is significantly reduced or minimized by using time-efficient audio coding and decoding, limited (or no) retransmissions, reduced time and frequency of acknowledgements, and by combining Bluetooth Classic (BTC) packets for downlink audio and downlink control with Bluetooth Low Energy (BTLE) packets for uplink control, uplink acknowledgements, and inter-device wireless communication. Combining BTC packets and BTLE packets within a single Bluetooth frame allows acknowledgements with reduced latency. Forward error correction (FEC) audio coding and decoding, such as with Reed-Solomon (RS) codes, along with packet loss concealment (PLC) provides for robustness under variable wireless conditions. The number of retransmissions and packet concealments per frame cycle can be limited to an upper threshold (e.g., a maximum number) to satisfy a low latency requirement. Request for retransmission can occur in the same frame in which an audio packet is lost or received with error, and retransmission can occur in the immediately following frame. High data rate uncompressed audio may be used to improve PLC. Applications for ultra-low latency, high data rate audio include gaming, music synthesis, augmented reality, virtual reality, professional audio, and the like.

Other aspects and advantages of the disclosure will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

Wireless communication capabilities are available in a broad array of accessory devices that can be configured to communicate with source devices, such as with wireless audio synthesis, generation, playback, and/or streaming capable source devices. For example, wireless audio output devices, such as a wireless headset or a pair of wireless ear buds, can connect via a wireless personal area network (WPAN) connection to an audio source device in order to receive an audio stream, such as via an Advanced Audio Distribution Profile (A2DP) connection or another audio profile connection of a Bluetooth communication protocol. To reduce or minimize processing and communication latency, audio packets can be formatted using limited amounts compression or with no compression (e.g., in an uncompressed format) and with reduced or minimal error correction and concealment encoding. Transmit buffers at the audio source device and receive buffers at the audio output devices can be reduced or minimized to reduce latency further over conventional schemes in which longer de-jitter buffers are used. While conventional schemes can require tens of milliseconds for audio coding to generate an encoded audio packet and up to a few hundred milliseconds of buffering, resulting in over 250 milliseconds of end-to-end latency, the methods and apparatus described herein target an end-to-end latency of only a few milliseconds (or less) of latency over a Bluetooth connection between the source device and the audio output devices.

In addition to low latency, the wireless audio stream supports high quality audio reproduction providing greater than 1 Mbps audio, e.g. at a rate of at least 1.92 Mbps. In some embodiments, the Bluetooth high throughput, ultra-low latency audio connection is included in an end-to-end audio synthesis application that requires a response time for reproducing audio associated with a physical action of less than ten milliseconds, e.g., for the time from detecting a physical action at a device that is in communication directly or indirectly with the audio source device (or with the audio source device itself) to the time of audio reproduction at the audio output devices. In some embodiments, the audio data includes two (or more) channels of pulse code modulation (PCM) audio encoded with at least 20-bit audio samples using at least a 48 kHz sampling rate. In some embodiments, at least 300 bytes of audio payload are communicated in each Bluetooth frame that spans 1.25 milliseconds. In some embodiments up to 50 bytes of control data payload is combined with audio payload data in a Bluetooth Frame. In some embodiments, few retransmissions, e.g., at most one retransmission per set of ten to fifteen Bluetooth frames, or no retransmissions of audio packets occur. In some embodiments, the audio source device audio output devices (e.g., the wireless headset or set of wireless ear buds) are separated by a distance of less than ten centimeters. In some embodiments, the radio frequency (RF) band used for communication between the audio source device and the wireless headset/ear buds (audio output devices) is not shared with other wireless activity by the audio source device or by the wireless headset/ear buds while high throughput, ultra-low latency audio streaming occurs. In some embodiments, an audio sampling clock domain and a WPAN clock domain are synchronized at the audio source device and at the audio output device(s). In some embodiments, the audio output device(s) is connected only to the audio source device and is not connected to any other wireless devices when receiving one or more high throughput, ultra-low latency audio streams. In some embodiments, accessory controller devices (separate from the audio output devices) interact with the audio source device (or with other wireless devices further upstream from the audio source device) using a connection separate from and in a different RF band than the wireless connection between the audio source device and the audio output device(s).

In some embodiments, audio packets are encoded using a high throughput proprietary extension to standard Bluetooth data rates, e.g., at a data transfer rate of at least 3 Mbps. In some embodiments, the high throughput audio packets are encoded using Reed-Solomon encoding, are transmitted using 4 MHz bandwidth channels, and are formatted in accordance with a Bluetooth EDR2 short symbol format. In some embodiments, the audio source device combines Bluetooth Classic (BTC) packets with Bluetooth Low Energy (BTLE) packets together in a single 1.25 millisecond frame. In some embodiments, a downstream (source to output) audio packet includes a payload of 350 bytes, which can include, e.g., 300 bytes of audio data and 50 bytes of control data, where the payload is protected with reduced or minimal forward error correction (FEC) encoding, such as by using a simple Reed-Solomon code, supplemented with a cyclic redundancy check (CRC) and a message integrity check (MIC). In some embodiments, audio packets are transmitted downstream in successive 1.25 millisecond frames with reduced or minimal numbers of upstream packets, such as acknowledgements and/or control packets, communicated at most once for every ten to fifteen downstream audio packets, e.g., every 15 milliseconds or every 30 milliseconds.

In some embodiments, control data included in downstream audio packets include instructions for RF channel usage and/or interference information. In some embodiments, control data in upstream packets include control feedback to adjust generation of the audio packets by the audio source device (or by another device further upstream from the audio source device), e.g., indications for changes in volume levels, switching roles between wireless ear buds, and the like. In some embodiments, a 1.25 millisecond frame includes a downstream audio packet that includes audio data and control data and sufficient idle time in the frame remains for an upstream acknowledgement and/or for a control packet and/or for inter-device communication. In some embodiments, up to one retransmission of a downlink audio packet is allowed for every ten to fifteen downlink audio packets transmitted. In some embodiments, an acknowledgement is provided for each downlink audio packet. In some embodiments, uplink acknowledgements (indicating correct reception) for downlink audio packets are not used, and downlink audio packets are assumed to be correctly received unless an uplink negative acknowledgement (NACK) is received by the audio source device. In some embodiments, a block acknowledgement is provided for a set of two or more downlink audio packets.

In some embodiments, a 1.25 millisecond frame includes a downlink audio packet that occupies less than half of the 1.25 millisecond frame, e.g., a downlink audio packet having a time span of 0.55 milliseconds; and the 1.25 millisecond frame further includes one or more of: (i) an idle time period spanning at least half of the 1.25 millisecond frame, (ii) an uplink control packet spanning less than one quarter of the 1.25 millisecond frame, e.g., an uplink control packet time of 0.1 milliseconds, or (iii) an inter-device control packet spanning less than one quarter of the 1.25 millisecond frame, e.g., an inter-device control packet time of 0.1 milliseconds.

In some embodiments, the downlink audio packets are formatted to be compatible with a Bluetooth Classic (BTC) wireless communication protocol and/or a proprietary extension thereof. In some embodiments, the uplink control packets are formatted to be compatible with a Bluetooth Low Energy (BTLE) communication protocol and/or a proprietary extension thereof. In some embodiments, the inter-device control packets are formatted to be compatible with a Bluetooth Low Energy (BTLE) communication protocol and/or a proprietary extension thereof. In some embodiments, an intra-frame spacing between a downlink audio packet and a subsequent uplink control packet or inter-device control packet within the same 1.25 millisecond frame satisfies timing for a BTLE communication protocol. In some embodiments, an intra-frame spacing between an uplink control packet and an inter-device control packet within the same 1.25 millisecond frame satisfies timing for a BTLE communication protocol. In some embodiments, an intra-frame spacing between a downlink audio packet and an uplink control packet or an inter-device control packet within the same 1.25 millisecond frame spans a time period shorter than required for a BTC communication protocol.

In some embodiments, the audio output device(s) that receives the downlink audio packets includes a packet loss concealment (PLC) function to conceal errors detected in and/or loss of one or more downlink audio packets. In some embodiments, at most one retransmission and/or one PLC operation is allowed during a cycle of downlink frames that span a time period used for transmission of ten to fifteen consecutive downlink audio packets. In some embodiments, downlink audio packets include either audio data only or a combination of audio data and control data.

These and other embodiments are discussed below with reference to FIGS. 1A, 1B, 2A, 2B, 2C, and 3; however, those skilled in the art will readily appreciate that the detailed description given herein with respect to these figures is for explanatory purposes only and should not be construed as limiting.

In accordance with various embodiments described herein, the terms "wireless communication device," "wireless device," "mobile device," "mobile station," and "user equipment" (UE), may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or fifth generation (5G) or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies. In some embodiments, the WPAN technology can include a Bluetooth wireless communication subsystem or radio, and the Bluetooth radio can implement one or more versions of a Bluetooth communication protocol in accordance with a present or future developed Bluetooth Special Interest Group (SIG) technology.

Additionally, it should be understood that user equipment (UE) described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Figure 1A:
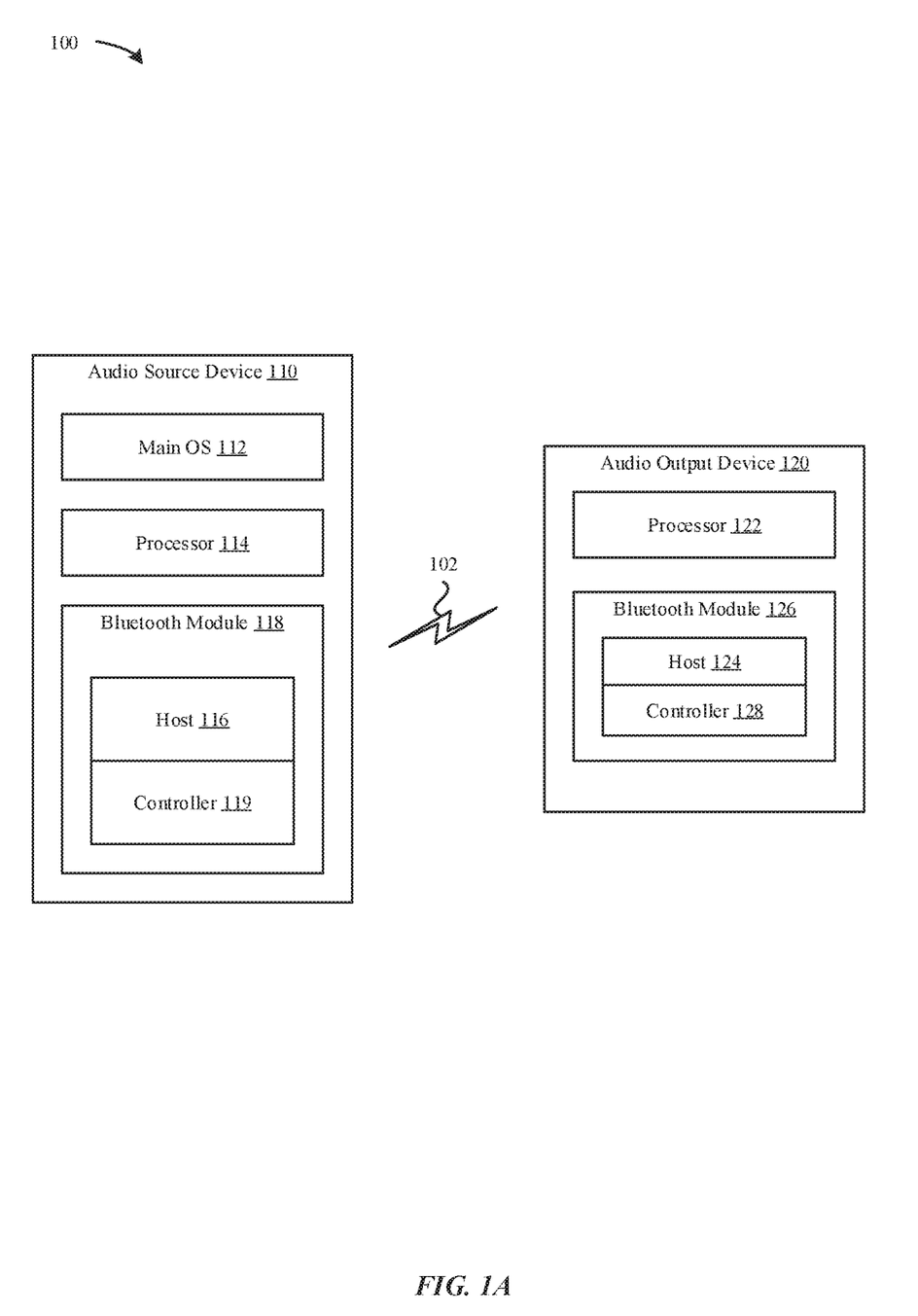
FIG. 1A illustrates a block diagram of select exemplary components of an audio source device and an audio output device to implement various techniques described herein, in accordance with some embodiments.

FIG. 1A illustrates a (simplified) block diagram 100 of several exemplary components of an audio source device and an audio output device that can be configured to implement various techniques described herein. FIG. 1A illustrates an example system that includes an audio source device 110 and an audio output device 120, (which may also be referred to as an accessory device, an accessory audio output device, or an audio reproduction device). The audio source device 110 can represent any form of a wireless computing device (e.g., a smartphone, a tablet, a laptop, an access point, a wearable device, etc.) that is capable of interfacing with other wireless computing devices (e.g., with the audio output device 120) and can provide data, e.g., streaming audio, to the audio output device 120. According to some embodiments, the audio output device 120 can represent peripheral devices that are capable of connecting to and communicating with the audio source device 110 and can receive streaming audio from the audio source device 110. It is noted, however, that the audio output device 120 is not limited to representing a peripheral device, and can represent any wireless computing device capable of streaming audio reception and reproduction implementing the techniques described herein. The audio output device 120, e.g., a wireless headset or a pair of wireless headphones, can pair wirelessly with the audio source device 110. In some embodiments, the audio output device 120 communicates bi-directionally with the audio source device 110 to receive downlink (source to output) audio data and/or control commands and to transmit uplink control commands, such as volume adjustments, or feedback commands, such as a positive acknowledgement (or block acknowledgement) indicating correct reception of the audio packets and/or control packets or a negative acknowledgement indicating an incorrect reception (or loss) of one or more audio packets.

As shown in FIG. 1A, the audio source device 110 includes, among other components, a main operating system (OS) 112, a processor 114, and a Bluetooth module 118. The processor 114, in conjunction with a memory of the audio source device 110 (not illustrated in FIG. 1), can implement the main OS 112, which can be configured to execute various native OS applications and user applications, e.g., media delivery applications, such as used for streaming and/or communicating audio packets, and wireless communication protocol stacks. Similarly, the audio output device 120 includes, among other components, a processor 122 and a Bluetooth module 126. The audio source device 110 can communicate with the audio output device 120 via a wireless communication link 102 (e.g., over a wireless personal area network (WPAN) link, which can include a Bluetooth link).

In some implementations, Bluetooth modules 118 and 126 include respective hosts 116 and 124 that represent upper layers of a BT stack and controllers 119 and 128 that can represent lower layers of a BT stack. The hosts 116 and 124 can be implemented on the processors 114 and 122 respectively and/or on separate processors (not shown). It is also noted that the hosts 116 and 124 and the controllers 119 and 128 respectively, can represent a single processing unit (e.g., in low power devices) or separate processing units. The upper layers of the BT stack can include the Logical Link Control and Adaptation Protocol (L2CAP), the Attribute Protocol (ATT), the Generic Attribute Profile (GATT), the Security Manager Protocol (SMP) and the Generic Access Profile (GAP), which are components of the different Bluetooth protocols supported by the Bluetooth modules 118 and 126. The lower layers of the BT stack and include a Physical Layer (PHY), a Link Layer (LL), and a host controller interface (HCI), which also can be components of the different Bluetooth protocols supported by the Bluetooth modules 118 and 126. In some embodiments, hosts 116 and 124 communicate with the controllers 119 and 128 via the HCI interface. Hosts 116 and 124 can provide HCI commands to the Link Layer of the respective controllers 119 and 128 for the purposes of establishing and/or maintaining connections, while the Link Layers can manage advertisement, scanning, and connection establishment.

The host 116 of the audio source device 110 can communicate with the host 124 of the audio output device 120 to establish the wireless communication link 102. In some embodiments, the functions of the host 116 of the Bluetooth module 118 are provided at least in part by the main operating system (OS) 112 executing on the processor 114. In some embodiments, the functions of the host 116 of the Bluetooth module 118 are provided at least in part by firmware executing wireless circuitry of the audio source device 110.

Figure 1B:
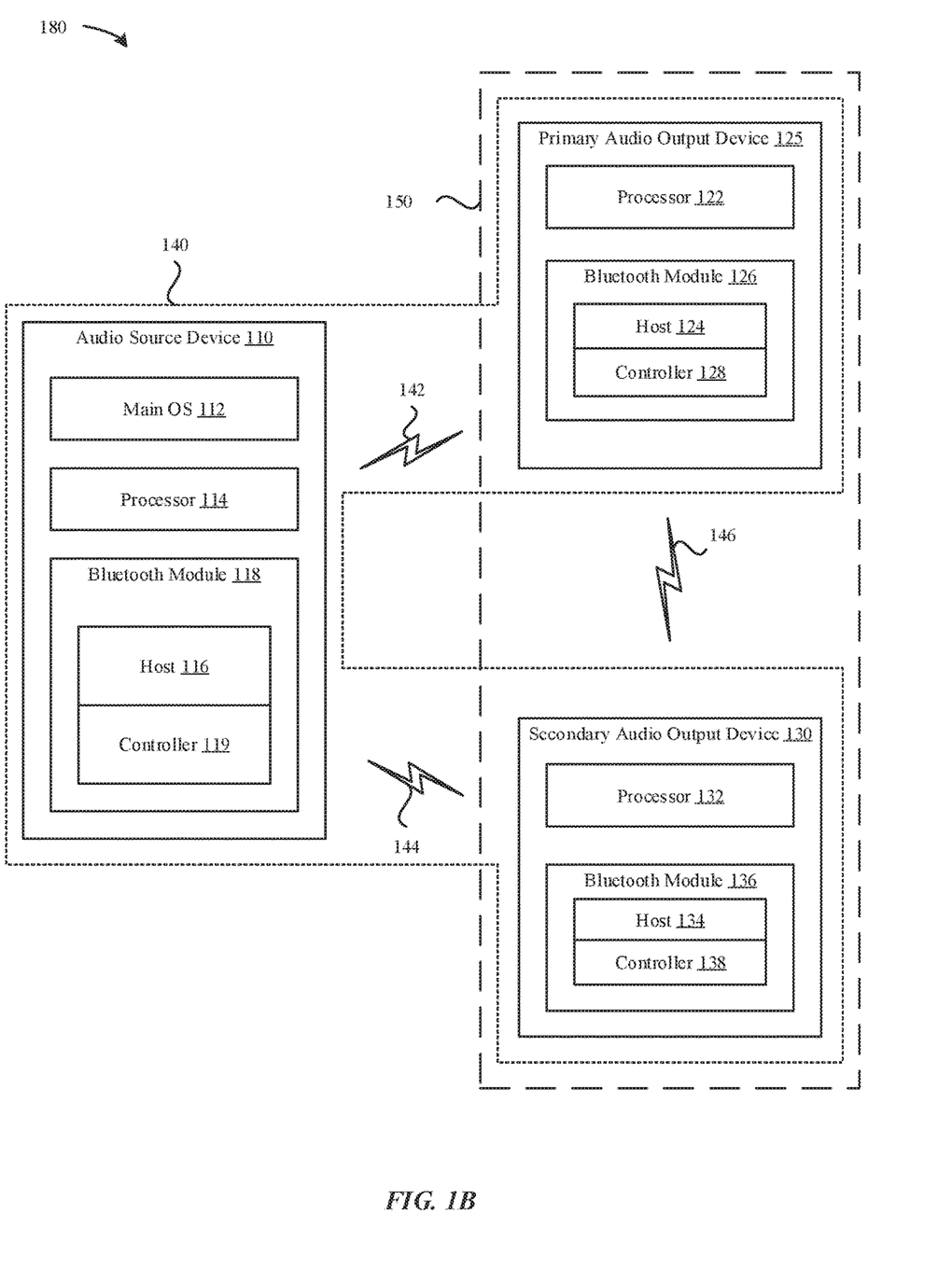
FIG. 1B illustrates a block diagram of select exemplary components of an audio source device and a pair of wirelessly linked audio output devices to implement various techniques described herein, in accordance with some embodiments.

FIG. 1B illustrates a (simplified) block diagram 180 of several exemplary components of the audio source device 110 and a pair of audio output devices, namely a primary audio output device 125 and a secondary audio output device 130, which can be configured to implement various techniques described herein. The audio source device 110 can provide data, e.g., streaming audio, to both the primary audio output device 125 and the secondary audio output device 130, either separately via parallel wireless connections, or via a connection to the primary audio output device 125, which can relay audio packets and/or control packets to and from the secondary audio output device 130. The primary audio output device 125 and the secondary audio output device 130 can represent a pair of peripheral devices, e.g., a pair of wireless ear buds, that can pair wirelessly with the audio source device 110 and can communicate with each other in addition to communicating with the audio source device 110. In some embodiments, the primary audio output device 125 communicates bi-directionally with the audio source device 110 to exchange control commands on behalf of both the primary audio output device 125 and the secondary audio output device 130. In some embodiments, the primary audio output device 125 and the secondary audio output device 130 can exchange roles as primary and secondary devices respectively. In some embodiments, each of the primary audio output device 125 and the secondary audio output device 130 can receive streaming audio from the audio source device 110, e.g., in parallel. In some embodiments, the primary audio output device 125 and the secondary audio output device 130 can acknowledge none, some, or all streaming audio packets and/or control packets received from the audio source device 110, e.g., separately or jointly providing acknowledgements. In some embodiments, the primary audio output device 125 can acknowledge streaming audio packets and/or control packets received from the audio source device 110 for both the primary audio output device 125 and the secondary audio output device 130.

As shown in FIG. 1B, the audio source device 110 includes components as described for the audio source device 110 illustrated in FIG. 1A. Similarly, the primary audio output device 125 includes components as described for the audio output device 120 illustrated in FIG. 1A. In addition, the secondary audio output device 130 includes, among other components, a processor 132 and a Bluetooth module 136. The audio source device 110 can communicate with the primary audio output device 125 via a wireless communication link 142 (e.g., over a wireless personal area network (WPAN) link, which can include a Bluetooth link). In some embodiments, the audio source device 110 can also communicate with the secondary audio output device 130 via another wireless communication link 144 (e.g., over a wireless personal area network (WPAN) link, which can include a Bluetooth link). The wireless communication links 142 and 144 can form a WPAN network 140 (or Bluetooth network or piconet) in which the audio source device 110 assumes the role of a master device, and the primary audio output device 125 and the secondary audio output device 130 assume the roles of slave devices. The master device (the audio source device 110) can manage connections with a number of slave devices to form the WPAN (Bluetooth) network 140. Furthermore, the primary audio output device 125 can communicate with the secondary audio output device 130 via a separate wireless communication link 146, e.g., over a second wireless personal area network (WPAN) link, which can include a Bluetooth link or an Untethered Protocol (UTP) link) to form a separate WPAN network 150. With respect to WPAN network 150, the primary audio output device 125 can function as a master device, while the secondary audio output device 130 can function as a slave device. Together the WPAN network 140 and the WPAN network 150 can form a scatternet of two independent WPANs (or piconets).

In some implementations, Bluetooth modules 118, 126, and 136 include respective hosts 116, 124, 134 that represent upper layers of a BT stack and controllers 119, 128, 138 that can represent lower layers of a BT stack. The hosts 116, 124, 134 can be implemented on the processors 114, 122, 132 respectively and/or on separate processors (not shown). It is also noted that the hosts 116, 124, 134 and the controllers 119, 128, 138 respectively, can represent a single processing unit (e.g., in low power devices) or separate processing units. The upper layers of the BT stack can include the Logical Link Control and Adaptation Protocol (L2CAP), the Attribute Protocol (ATT), the Generic Attribute Profile (GATT), the Security Manager Protocol (SMP) and the Generic Access Profile (GAP), which are components of the different Bluetooth protocols supported by the Bluetooth modules 118, 126, 136. The lower layers of the BT stack and include a Physical Layer (PHY), a Link Layer (LL), and a host controller interface (HCI), which also can be components of the different Bluetooth protocols supported by the Bluetooth modules 118, 126, 136. In some embodiments, hosts 116, 124, 134 communicate with the controllers 119, 128, 138 via the HCI interface. Hosts 116, 124, 134 provide HCI commands to the Link Layer of the respective controllers 119, 128, 138 for the purposes of establishing and/or maintaining BTC connections, while the Link Layers manage advertisement, scanning, and connection establishment.

The host 116 of the audio source device 110 can communicate with the host 124 of the primary audio output device 125 to establish the communication link 142 to form a part of the WPAN network 140. The host 116 of the audio source device 110 can communicate with the host 134 of the secondary audio output device 130 to establish the communication link 144 to form another part of the WPAN network 140 (alternatively, communication link 144 can be used to snoop (or eavesdrop) on communications between the audio source device 110 and the primary audio output device 125). The host 124 of the primary audio output device 125 can communicate with the host 134 of the secondary audio output device 130 to establish the communication link 146 to form the WPAN network 150. Upon establishment of the communication link 142 with the primary audio output device 125, the host 116 of the audio source device 110 can query the host 124 of the primary audio output device 125 for device capabilities, which can include a topology of the primary audio output device 125. The host 124 of the primary audio output device 125 can respond to the query for capabilities from the host 116 of the audio source device 110 with an indication of scheduling requirements and/or limitations for communication by the primary audio output device 125, e.g., an indication of requirements for internal communication with another device such as for communication with the secondary audio output device 130. In some embodiments, the functions of the host 116 of the Bluetooth module 118 are provided at least in part by the main operating system (OS) 112 executing on the processor 114. In some embodiments, the functions of the host 116 of the Bluetooth module 118 are provided at least in part by firmware executing wireless circuitry of the audio source device 110.

Figure 2A:
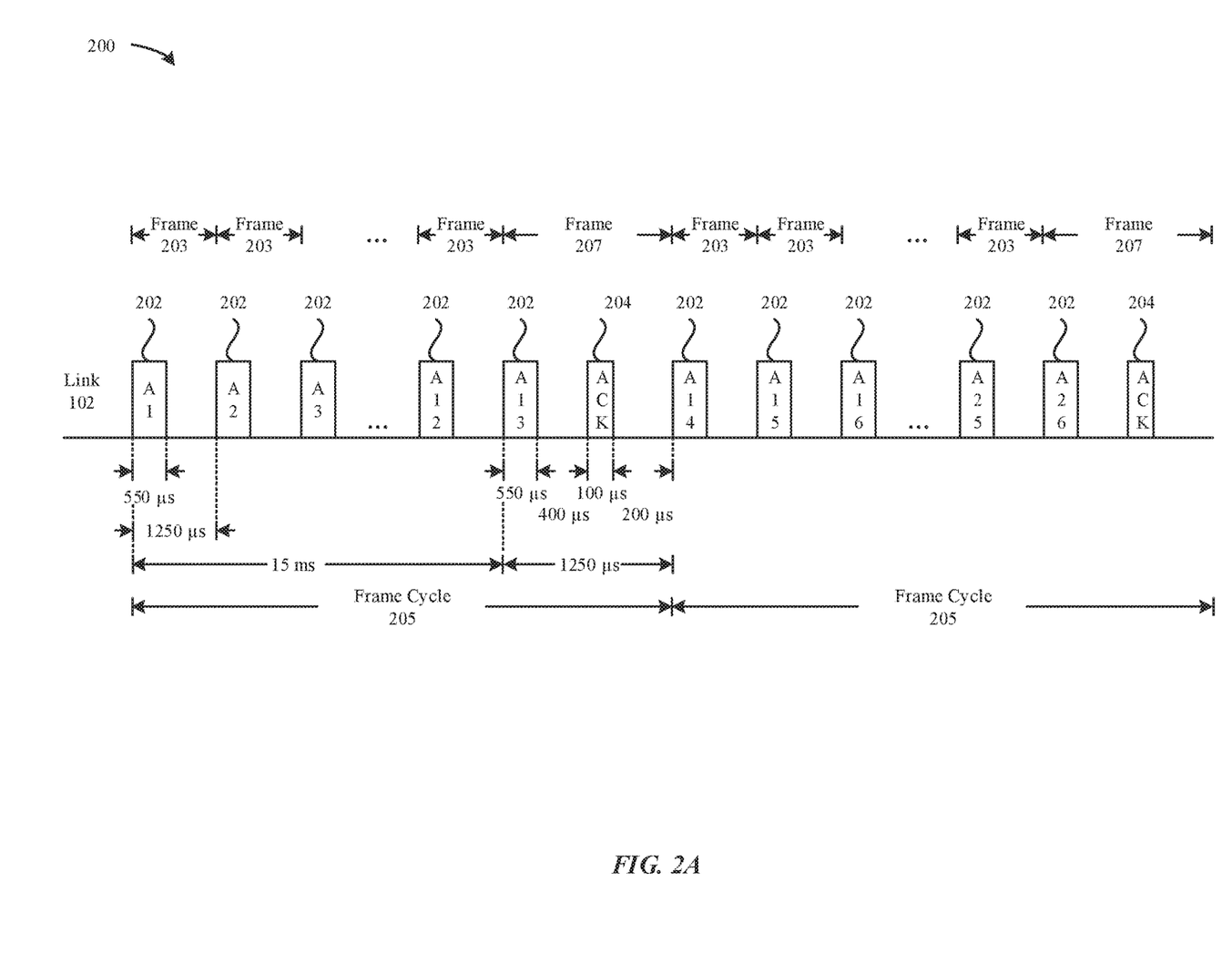
FIG. 2A illustrates a diagram of an example of ultra-low latency communication between an audio source device and an audio output device to implement various techniques described herein, in accordance with some embodiments.

FIG. 2A illustrates a diagram 200 of an example of ultra-low latency communication between an audio source device 110 and an audio output device 120 over a wireless communication link 102, which can operate in accordance with a WPAN communication protocol, such as a BTC or BTLE (or both) communication protocol or proprietary extensions thereof. The audio source device 110 can send an audio packet 202 via the wireless communication link 102 to the audio output device 120. The audio packet 202 can include encoded audio bytes, which can be derived from uncompressed high rate sampled audio in some embodiments. The audio packet 202 can also optionally include control bytes. In some embodiments, the audio packet 202 includes a payload that includes a combination of 300 bytes of audio data and 50 bytes of control data, where the audio data and/or the control data can be further supplemented with one or more of: (i) forward error correction (FEC) bytes, (ii) a cyclic redundancy check (CRC), or (iii) a message integrity check (MIC). In some embodiments, the audio packet 202 occupies a time period of 550 microseconds, which can be less than half of a 1250 microsecond frame. In some embodiments, each frame of a set of 1250 microsecond frames includes an idle time period that spans at least half of the frame. In some embodiments, the audio packet 202 is formatted in accordance with a BTC wireless communication protocol or an extension thereof, such as a high data throughput format to accommodate at least 300 bytes of audio data per 550 microsecond long audio packet. In some embodiments, twelve audio packets 202 are communicated between the audio source device 110 and the audio output device 120 every 15 milliseconds, with one audio packet transmitted each 1250 microsecond frame. In some embodiments, at least one frame per 15 milliseconds includes a control packet 204 (labeled as an acknowledgement (ACK) packet) communicated in the uplink direction from the audio output device 120 to the audio source device 110. In some embodiments, the control packet 204 is formatted in accordance with a BTLE wireless communication protocol or an extension thereof. The control packet 204 can include one or more of: an acknowledgement for at least one previously received audio packet 202, a block acknowledgement for a set of two or more previously received audio packets 202, a negative acknowledgement for at least one previously received or lost audio packet 202, or control data. The control data of the control packet 204 can include user commands received via an interface of the audio output device 120, e.g., volume adjustment commands. In some embodiments, the control packet 204 occupies a time period of 100 microseconds during the 1250 microsecond frame. In some embodiments, a frame cycle 205 includes a set individual frames 203 with sequential downlink audio packets 202, without uplink control packets 204, followed by a single frame 207 that includes both a downlink audio packet 202 and an uplink control packet 204, and this frame cycle 205 repeats periodically. In some embodiments, the number of frames 203 that only include audio packets 202 can be dynamically adjusted to match performance requirements for end-to-end latency and/or for audio reproduction sound quality. In some embodiments, control information included in some audio packets 202 communicated in the downlink direction from the audio source device 110 to the audio output device 120 include one or more of: interference information, frequency channel use, or frequency channel hopping patterns. In some embodiments, more than one uplink control packet 204 is included in a frame cycle 205. In some embodiments, a frame cycle 205 does not include an uplink control packet 204. The frame cycle 205 shown in FIG. 2A provides for downlink audio data and control data communication from the audio source device 110 to the audio output device 120 with limited (but sufficient) control messaging in the uplink direction from the audio output device 120 to the audio source device 110. Each audio packet 202 in each frame cycle 205 can include a reduced or minimal amount of forward error correction (FEC) encoding, e.g., by using a simple Reed-Solomon code, and the audio output device 120 can correct and/or conceal errors detected in received audio packets 202. Retransmission of audio packets is not provided for in the frame cycle 205 to avoid incurring additional latency in reproduction of the audio at the audio output device 120. Spacing between successive uplink control packets 204 can be determined based on requirements for user-initiated control commands received via the audio output device 120 and transmitted to the audio source device 110. As illustrated in FIG. 2A, the frame 207 includes both a downlink audio packet 202 (labeled A13), which can be formatted based on a BTC protocol, and an uplink control packet 204 (labeled ACK), which can be formatted based on a BTLE protocol. Thus, the scheme illustrated in FIG. 2A provides for mixing a combination of BTC and BTLE packets in the same frame 207.

Figure 2B:
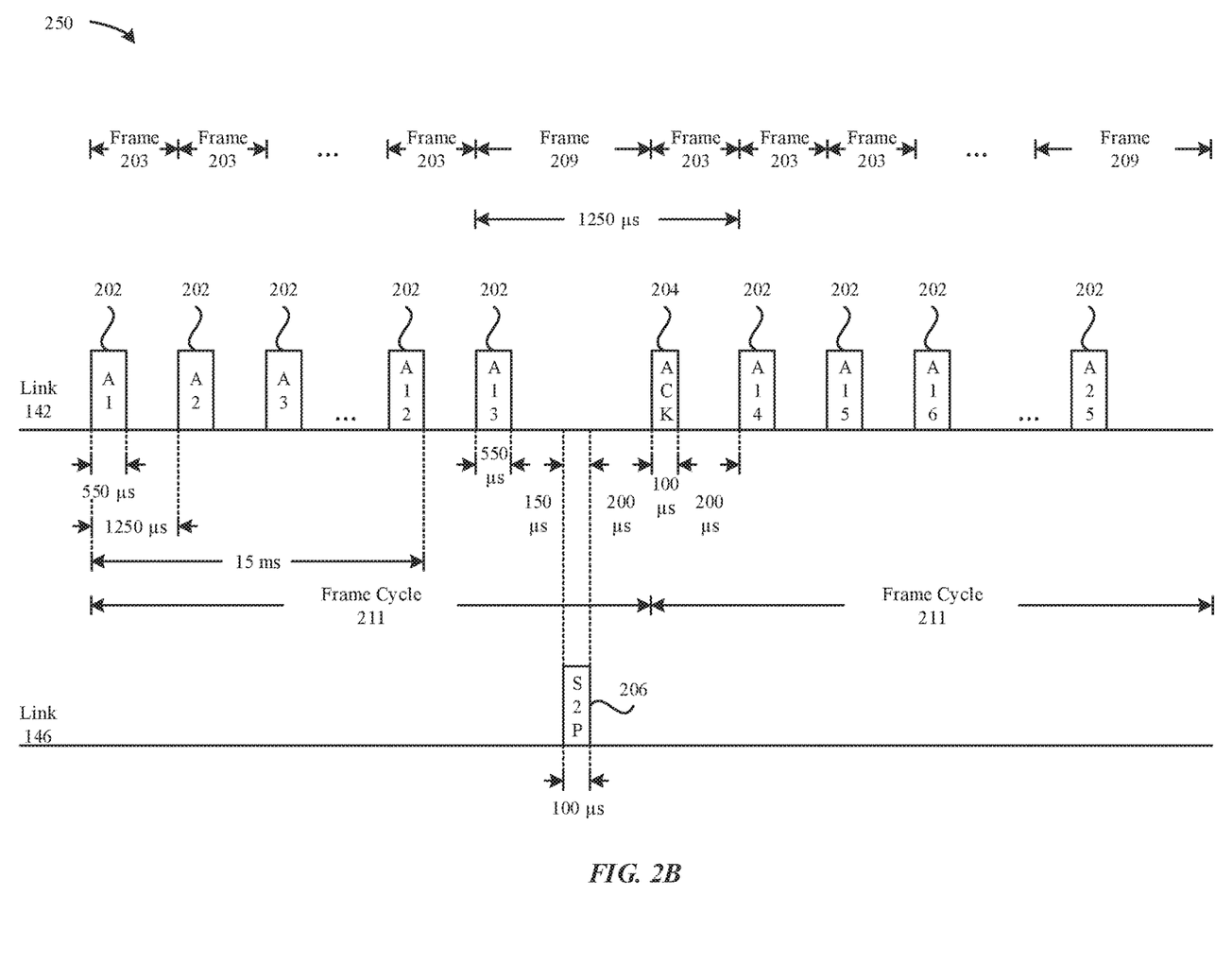
FIG. 2B illustrates a diagram of an example of ultra-low latency communication between an audio source device and a pair of wirelessly linked audio output devices to implement various techniques described herein, in accordance with some embodiments.

FIG. 2B illustrates a diagram 250 of an example of ultra-low latency communication between an audio source device 110 and a pair of wirelessly linked audio output devices, e.g., primary audio output device 125 and secondary audio output device 130. The audio source device 110 communicates with the primary audio output device 125 via the wireless communication link 142, which can operate in accordance with a Bluetooth Classic (BTC) and/or Bluetooth Low Energy (BTLE) wireless communication protocol and/or extensions thereof. In some embodiments, the audio source device 110 communicates bi-directionally over the wireless communication link 142 with the primary audio output device 125, e.g., transmitting audio packets, which can include a combination of audio data and control data, to the primary audio output device 125 and receiving control packets, which can include control information and/or positive/negative acknowledgements from the primary audio output device 125. In some embodiments, the audio source device 110 communicates uni-directionally over the wireless communication link 146 (not shown) with the secondary audio output device 130, e.g., transmitting audio packets, which can include a combination of audio data and control data, to the secondary audio output device 130. In some embodiments, the audio packets are transmitted by the audio source device 110 at the same time to both the primary audio output device 125 and the secondary audio output device 130, e.g., using one transmission, which can be received by both the primary audio output device 125 and the secondary audio output device 130. In some embodiments, the primary audio output device 125 and the secondary audio output device 130 communicate with each other via a separate wireless communication link 146. The audio packet 202 can include a combination of uncompressed high rate sample audio and optionally control bytes, and the control packet 204 can include a combination of one or more of: acknowledgements, control commands, etc. as discussed for FIG. 2A.

A frame cycle 211 includes a set of frames 203 that include one audio packet 202 per frame 203, where the audio packet 202 includes a combination of audio data and control data, followed by a frame 209 in which the audio packet 202 is followed by a first time period for communication of an inter-device control packet 206 between the primary audio output device 125 and the secondary audio output device 130 and a second time period of communication of a control packet 204 from the primary audio output device 125 to the audio source device 110. The frame cycle 211 can repeat periodically. The frame cycle 211 shown in FIG. 2B provides for downlink audio data and control data communication from the audio source device 110 to the primary and secondary audio output devices 125/130 with limited (but sufficient) control messaging in the uplink direction from the primary audio output device 125 to the audio source device 110 and limited (but sufficient) communication between the primary audio output device 125 and the secondary audio output device 130. As with the scheme illustrated in FIG. 2A, the downlink audio packets 202 can be formatted in accordance with a BTC wireless communication protocol and/or an extension thereof, and the uplink control packets 204 can be formatted in accordance with a BTLE wireless communication protocol and/or an extension thereof.

Figure 2C:
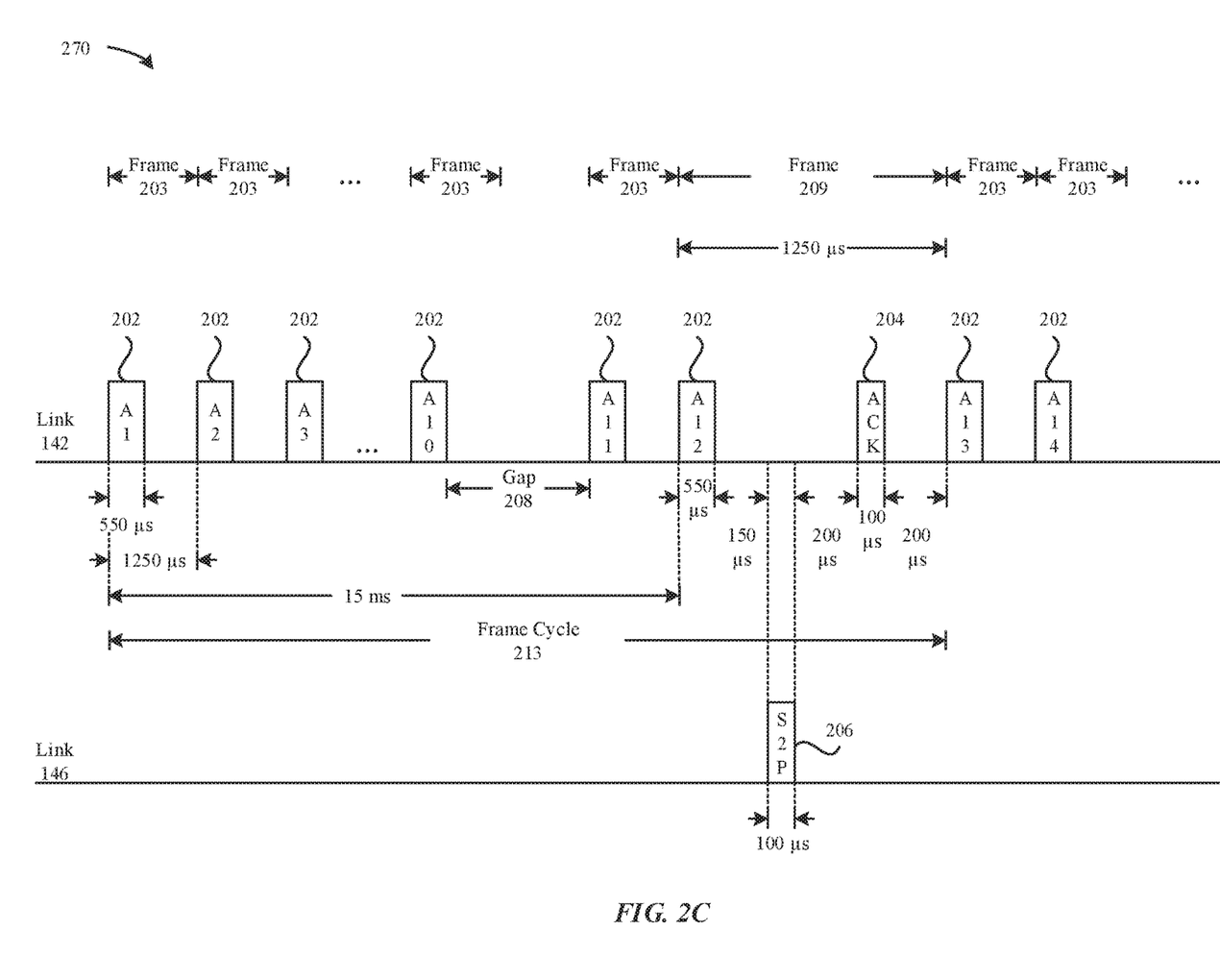
FIG. 2C illustrates a diagram of another example of ultra-low latency communication between an audio source device and a pair of wirelessly linked audio output devices to implement various techniques described herein, in accordance with some embodiments.

FIG. 2C illustrates a diagram 270 of another example of ultra-low latency communication between an audio source device 110 and a pair of wirelessly linked audio output devices, e.g., the primary audio output device 125 and the secondary audio output device 130. FIG. 2C extends the schemes illustrated in FIGS. 2A and 2B to include a gap time period 208 during each frame cycle 213 to provide for at least one retransmission. Each frame cycle 213 includes a set of frames 203 that include downlink audio packets 202 (from the audio source device 110 to the primary audio output device 125 and the secondary audio output device 130), without uplink control packets (from the primary audio output device 125 or the secondary audio output device 130 to the audio source device 110) or communication of a control packet between the primary and secondary audio output devices 125/130, followed by a single frame 209 that includes an uplink control packet 204 communicated from the primary audio output device 125 to the audio source device 110 and a inter-device control packet 206 communicated between the primary audio output device 125 and the secondary audio output device 130. The inter-device control packet 206 can include user-initiated control commands, such as to change a volume level or another audio playback function. The frame cycle 213 of FIG. 2C differs from the frame cycle 211 of FIG. 2B by including a gap time period 208. More generally, the frame cycle 213 schedules fewer downlink audio packets 202 for each cycle to allow for one (or for longer gaps more than one) retransmission of a previously sent but erroneously received (or lost) downlink audio packet 202. Comparing the frame cycle 211 in FIG. 2B with the frame cycle 213 in FIG. 2C, the former includes thirteen scheduled downlink audio packets 202, while the latter only includes twelve scheduled downlink audio packets 202, which allows for a single retransmission. In some embodiments, when the primary audio output device 125 detects an unrecoverable error for or a loss of an audio packet 202, the primary audio output device 125 opportunistically sends an uplink control packet (not shown) to the audio source device 110 to indicate the error and/or loss of the audio packet 202 and thereby requests retransmission of the indicated errant or lost audio packet 202. In some embodiments, the uplink control packet includes a negative acknowledgement transmitted to the audio source device 110 by the primary audio output device 125 in the same frame 203 in which the errant/lost audio packet 202 occurs. By responding in the same frame 203, the audio source device 110 can retransmit the errant/lost audio packet 202 in an immediately subsequent frame 203 and shift the remaining audio packets 202 to frames 203 that follow thereafter. Thus, the gap time period 208 can be placed as required within the frame cycle 213 to accommodate a loss of an audio packet 202. The number of gap time periods 208 can be changed, e.g., increased to accommodate more retransmissions per frame cycle 213, or decreased, e.g., not used when no retransmissions are required. As retransmission of audio packets 202 incur latency, an upper threshold on the number of retransmissions per frame cycle 213 can limit additional incurred latency. When the upper threshold number of retransmissions per frame cycle 213 is reached during a particular frame cycle 213, no additional retransmission may occur until the next frame cycle 213. Retransmissions of an audio packet 202 for a particular frame 203, in some embodiments, only occur in an immediately subsequent frame 203 to reduce latency. In some embodiments, the primary audio output device 125 and/or the secondary audio output device 130 can also perform packet loss concealment in lieu of and/or in addition to requesting retransmission of an errant/lost audio packet 202.

Representative Embodiments

In some embodiments, a method for low latency communication for a primary audio output device paired with an audio source device and with a secondary audio output device includes the following actions performed by the primary audio output device: (i) detecting an error in a downlink audio packet received from an audio source device in a first portion of a frame of a frame cycle that includes a sequence of frames that include downlink audio packets; (ii) transmitting, to the audio source device, an uplink control packet during a second portion of the frame of the frame cycle, the uplink control packet providing an indication to request retransmission of audio data of the downlink audio packet; (iii) receiving, from the audio source device, a second downlink audio packet in a subsequent frame that immediately follows the frame of the frame cycle, the second downlink audio packet including retransmission of the audio data; and (iv) disallowing requests for retransmissions of downlink audio packets for all frames of the frame cycle that follow the subsequent frame.

In some embodiments, the method further includes the primary audio output device, during a final frame of the frame cycle: receiving an inter-device control packet from the second audio output device, the inter-device control packet including indications of user-initiated commands received via the second audio output device; and transmitting a second uplink control packet to the audio source device, the second uplink control packet including information derived from the indications of the inter-device control packet. In some embodiments, the second uplink control packet further includes one or more of: an acknowledgement for at least one downlink audio packet, a block acknowledgement for a set of two or more downlink audio packets, a negative acknowledgement for at least one lost downlink audio packet, or control data. In some embodiments, the second uplink control packet further includes user commands received via an interface of the primary audio output device. In some embodiments, the inter-device control packet is formatted in accordance with a Bluetooth Low Energy (BTLE) wireless communication protocol or extension thereof. In some embodiments, the downlink audio packet received in the first portion of the frame is formatted in accordance with a Bluetooth Classic (BTC) wireless communication protocol or extension thereof; and the uplink control packet transmitted in the second portion of the frame is formatted in accordance with a Bluetooth Low Energy (BTLE) wireless communication protocol or extension thereof. In some embodiments, lengths of the downlink audio packets occupy a time interval less than half of corresponding frames that include the downlink audio packets. In some embodiments, downlink audio packets include at least 300 bytes of uncompressed audio data and up to 50 bytes of control data. In some embodiments, each frame of the frame cycle spans at most 1250 microseconds. In some embodiments, the frame cycle spans at most 20 milliseconds.

In some embodiments, a primary audio output device is configurable for low latency communication when paired with an audio source device and with a secondary audio output device, and the primary audio output device includes one or more processors communicatively coupled to a memory storing instructions that, when executed by the one or more processors, cause the primary audio output device to: (i) receive audio data in downlink audio packets over a frame cycle, each downlink audio packet occupying less than half of a corresponding frame; (ii) detect an error in one of the downlink audio packets; (iii) transmit an uplink control packet during a second half of a frame that includes the one of the downlink audio packets, the uplink control packet providing an indication to request retransmission of the audio data of the one of the downlink audio packets; (iv) receive a retransmission of the audio data of the one of the downlink audio packets; and (v) disallow requests for retransmissions of downlink audio packets during all subsequent frames of the frame cycle.

In some embodiments, execution of the instructions further causes the primary audio output device to, during a final frame of the frame cycle: receive an inter-device control packet from the second audio output device, the inter-device control packet including indications of user-initiated commands received via the second audio output device; and transmit a second uplink control packet to the audio source device, the second uplink control packet including information derived from the indications of the inter-device control packet. In some embodiments, the second uplink control packet further includes one or more of: an acknowledgement for at least one downlink audio packet, a block acknowledgement for a set of two or more downlink audio packets, a negative acknowledgement for at least one lost downlink audio packet, or control data. In some embodiments, the second uplink control packet further includes user commands received via an interface of the primary audio output device. In some embodiments, the downlink audio packets are formatted in accordance with a Bluetooth Classic (BTC) wireless communication protocol or extension thereof, and the uplink control packet and the second uplink control packet are formatted in accordance with a Bluetooth Low Energy (BTLE) wireless communication protocol or extension thereof. In some embodiments, the downlink audio packets include at least 300 bytes of uncompressed audio data and up to 50 bytes of control data. In some embodiments, each frame of the frame cycle spans at most 1250 microseconds.

In some embodiments, an apparatus is configurable for operation in a primary audio output device, and the apparatus includes a processor communicatively coupled to a memory storing instructions that, when executed by the processor, cause the primary audio output device to: (i) detect an error in a downlink audio packet received from an audio source device in a first portion of a frame of a frame cycle that includes a sequence of frames that include downlink audio packets; (ii) transmit, to the audio source device, an uplink control packet during a second portion of the frame of the frame cycle, the uplink control packet providing an indication to request retransmission of audio data of the downlink audio packet; (iii) receive, from the audio source device, a second downlink audio packet in a subsequent frame that immediately follows the frame of the frame cycle, the second downlink audio packet including retransmission of the audio data; and (iv) disallow requests for retransmissions of downlink audio packets for all frames of the frame cycle that follow the subsequent frame.

In some embodiments of the apparatus, execution of the instructions further causes the primary audio output device to, during a final frame of the frame cycle: receive an inter-device control packet from a second audio output device that is paired with the primary audio output device, the inter-device control packet including indications of user-initiated commands received via the second audio output device; and transmit a second uplink control packet to the audio source device, the second uplink control packet including information derived from the indications of the inter-device control packet.

Figure 3:
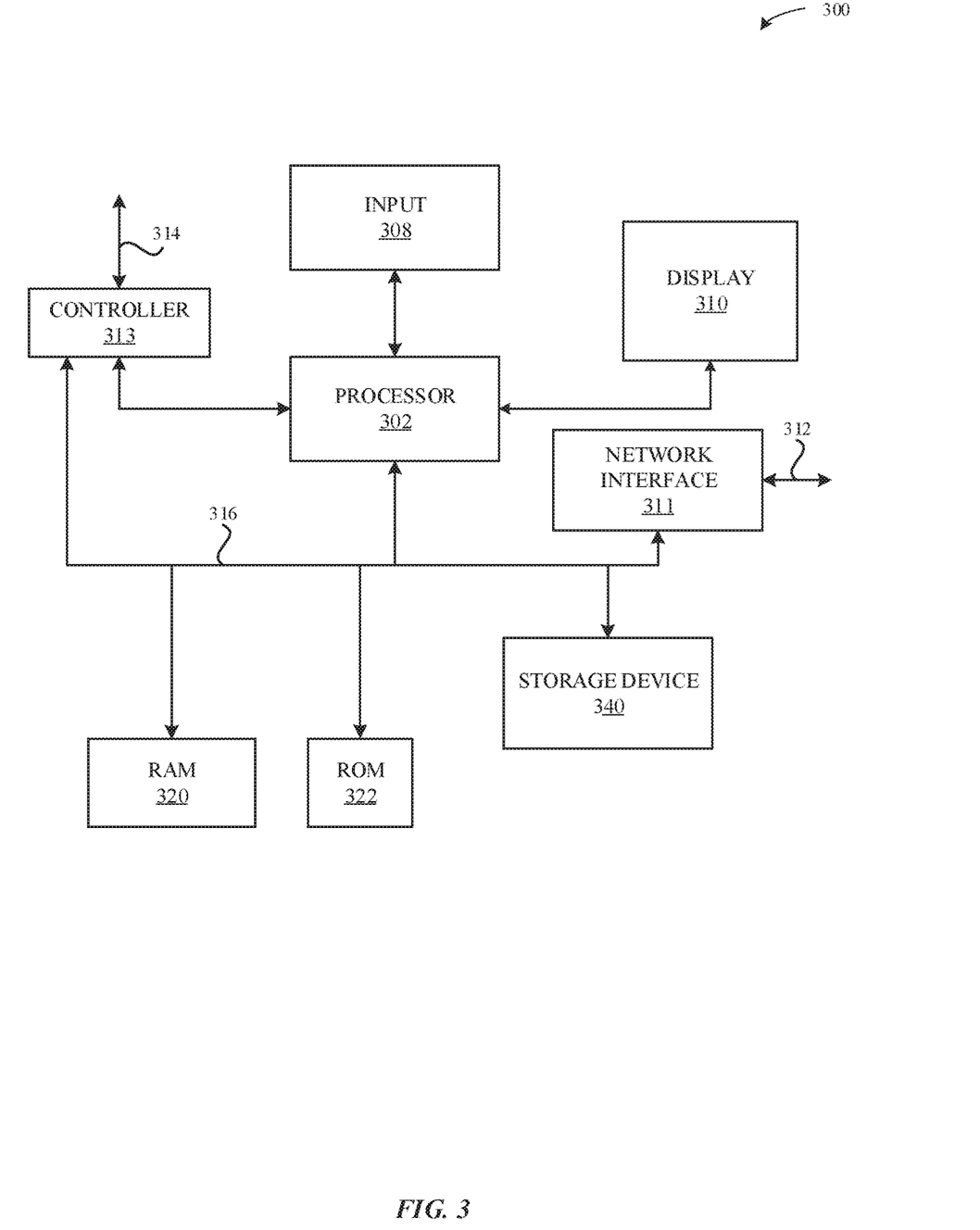
FIG. 3 illustrates an exemplary computing device that can be used to implement the various components described herein, in accordance with some embodiments.

FIG. 3 illustrates an exemplary computing device 300 that can be used to implement the various components described herein, according to some embodiments. In particular, the detailed view illustrates various components that can be included in the audio source device 110, the audio output device 120, the primary audio output device 125 and/or the secondary audio output device 130 illustrated in FIGS. 1A and 1B. As shown in FIG. 3, the computing device 300 can include a processor 302 that represents a microprocessor or controller for controlling the overall operation of computing device 300. The computing device 300 can also include multiple processors in some embodiments. The computing device 300 can also include a user input device 308 that allows a user of the computing device 300 to interact with the computing device 300. For example, the user input device 308 can take a variety of forms, such as a button, keypad, dial, touch screen, audio input interface, visual/image capture input interface, input in the form of sensor data, etc. Still further, the computing device 300 can include a display 310 (screen display) that can be controlled by the processor 302 to display information to the user. A data bus 316 can facilitate data transfer between at least a storage device 340, the processor 302, and a controller 313. The controller 313 can be used to interface with and control different equipment through and equipment control bus 314. The computing device 300 can also include a network/bus interface 311 that couples to a data link 312. In the case of a wireless connection, the network/bus interface 311 can include a wireless transceiver.

The computing device 300 also include a storage device 340, which can include a single disk or a plurality of disks (e.g., hard drives), and includes a storage management module that manages one or more partitions within the storage device 340. In some embodiments, the storage device 340 can include flash memory, semiconductor (solid state) memory or the like. The computing device 300 can also include a Random Access Memory (RAM) 320 and a Read-Only Memory (ROM) 322. The ROM 322 can store programs, utilities or processes to be executed in a non-volatile manner. The RAM 320 can provide volatile data storage, and stores instructions related to the operation of the computing device 300.

The various aspects, embodiments, implementations or features of the described embodiments can be used separately or in any combination. Various aspects of the described embodiments can be implemented by software, hardware, or a combination of hardware and software. The described embodiments can also be embodied as computer readable code on a computer readable medium. The computer readable medium is any data storage device that can store data that can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for low latency communication for a primary audio output device paired with an audio source device and with a secondary audio output device, the method comprising:

by the primary audio output device:
detecting an error in a downlink audio packet received from the audio source device in a first portion of a frame of a particular frame cycle of a sequence of periodically repeating frame cycles, each frame cycle comprising a set of frames that include downlink audio packets;
transmitting, to the audio source device, an uplink control packet during a second portion of the frame of the particular frame cycle, the uplink control packet providing an indication to request retransmission of audio data of the downlink audio packet;
receiving, from the audio source device, a second downlink audio packet in a subsequent frame of the frame cycle, the second downlink audio packet including retransmission of the audio data; and
when an upper threshold number of retransmissions per frame cycle is reached for the particular frame cycle, disallowing requests for retransmissions of previously transmitted downlink audio packets and newly transmitted downlink audio packets, while allowing reception of newly transmitted downlink audio packets without retransmission, for all frames of the particular frame cycle that follow the subsequent frame; and
re-allowing requests for retransmissions of downlink audio packets for a subsequent frame cycle that immediately follows the particular frame cycle.

2. The method of claim 1, further comprising:
by the primary audio output device during a final frame of the particular frame cycle:
receiving an inter-device control packet from the secondary audio output device, the inter-device control packet including indications of user-initiated commands received via the second audio output device; and transmitting a second uplink control packet to the audio source device, the second uplink control packet including information derived from the indications of the inter-device control packet.

3. The method of claim 2, wherein the second uplink control packet further comprises one or more of: an acknowledgement for at least one downlink audio packet, a block acknowledgement for a set of two or more downlink audio packets, a negative acknowledgement for at least one lost downlink audio packet, or control data.

4. The method of claim 2, wherein the second uplink control packet further comprises user commands received via an interface of the primary audio output device.

5. The method of claim 2, wherein the inter-device control packet is formatted in accordance with a Bluetooth Low Energy (BTLE) wireless communication protocol or extension thereof.

6. The method of claim 1, wherein:
the downlink audio packet received in the first portion of the frame is formatted in accordance with a Bluetooth Classic (BTC) wireless communication protocol or extension thereof; and
the uplink control packet transmitted in the second portion of the frame is formatted in accordance with a Bluetooth Low Energy (BTLE) wireless communication protocol or extension thereof.

7. The method of claim 1, wherein:
lengths of the downlink audio packets occupy a time interval less than half of corresponding frames that include the downlink audio packets; and
downlink audio packets include at least 300 bytes of uncompressed audio data and up to 50 bytes of control data.

8. The method of claim 1, wherein retransmission of audio data initially transmitted in a frame, when allowed, is restricted to occur in an immediately subsequent frame.

9. The method of claim 1, wherein:
each frame of the particular frame cycle spans at most 1250 microseconds; and
the particular frame cycle spans at most 20 milliseconds.

10. The method of claim 1, wherein the upper threshold number of retransmissions per frame cycle is increased or decreased adaptively by the audio source device to accommodate more or fewer retransmissions per frame cycle.

11. A primary audio output device configurable for low latency communication when paired with an audio source device and with a secondary audio output device, the primary audio output device comprising:
one or more processors communicatively coupled to a memory storing instructions that, when executed by the one or more processors, cause the primary audio output device to:
receive audio data in downlink audio packets over a particular frame cycle of a sequence of periodically repeating frame cycles, each frame cycle comprising a set of frames that include downlink audio packets and each downlink audio packet occupying less than half of a corresponding frame of the frame cycle;
detect an error a downlink audio packet received in a frame of the particular frame cycle;
transmit an uplink control packet during a second half of a frame that includes the downlink audio packet, the uplink control packet providing an indication to request retransmission of the audio data of the downlink audio packet;
receive a retransmission of the audio data of the downlink audio packet in a subsequent frame of the particular frame cycle; and
when an upper threshold number of retransmissions per frame cycle is reached for the particular frame cycle, disallow requests for retransmissions of previously transmitted downlink audio packets and newly transmitted downlink audio packets, while allowing reception of newly transmitted downlink audio packets without retransmission, during all subsequent frames of the particular frame cycle that follow the subsequent frame; and
re-allow requests for retransmission of downlink audio packets for a subsequent frame cycle that immediately follows the particular frame cycle.

12. The primary audio output device of claim 11, wherein retransmission of audio data initially transmitted in a frame, when allowed, is restricted to occur in an immediately subsequent frame.

13. The primary audio output device of claim 11, wherein execution of the instructions further causes the primary audio output device to:
during a final frame of the particular frame cycle:
receive an inter-device control packet from the second audio output device, the inter-device control packet including indications of user-initiated commands received via the second audio output device; and
transmit a second uplink control packet to the audio source device, the second uplink control packet including information derived from the indications of the inter-device control packet.

14. The primary audio output device of claim 13, wherein the second uplink control packet further comprises one or more of: an acknowledgement for at least one downlink audio packet, a block acknowledgement for a set of two or more downlink audio packets, a negative acknowledgement for at least one lost downlink audio packet, or control data.

15. The primary audio output device of claim 13, wherein the second uplink control packet further comprises user commands received via an interface of the primary audio output device.

16. The primary audio output device of claim 13, wherein:
the downlink audio packets are formatted in accordance with a Bluetooth Classic (BTC) wireless communication protocol or extension thereof; and
the uplink control packet and the second uplink control packet are formatted in accordance with a Bluetooth Low Energy (BTLE) wireless communication protocol or extension thereof.

17. The primary audio output device of claim 11, wherein:
the downlink audio packets include at least 300 bytes of uncompressed audio data and up to 50 bytes of control data; and
each frame of the particular frame cycle spans at most 1250 microseconds.

18. The primary audio output device of claim 11, wherein the upper threshold number of retransmissions per frame cycle is increased or decreased adaptively by the audio source device to accommodate more or fewer retransmissions per frame cycle.

19. An apparatus configurable for operation in a primary audio output device, the apparatus comprising a processor communicatively coupled to a memory storing instructions that, when executed by the processor, cause the primary audio output device to:

detect an error in a downlink audio packet received from an audio source device in a first portion of a frame of a particular frame cycle of a sequence of periodically repeating frame cycles, each frame cycle comprising a set of frames that include downlink audio packets;

transmit, to the audio source device, an uplink control packet during a second portion of the frame of the particular frame cycle, the uplink control packet providing an indication to request retransmission of audio data of the downlink audio packet;

receive, from the audio source device, a second downlink audio packet in a subsequent frame of the particular frame cycle, the second downlink audio packet including retransmission of the audio data; and     when an upper threshold number of retransmissions per frame cycle is reached for the particular frame cycle, disallow requests for retransmissions of previously transmitted downlink audio packets and newly transmitted downlink audio packets, while allowing reception of the newly transmitted downlink audio packets without retransmission, for all frames of the particular frame cycle that follow the subsequent frame; and     re-allow requests for retransmission of downlink audio packets for a subsequent frame cycle that immediately follows the particular frame cycle.

20. The apparatus of claim 19, wherein execution of the instructions further causes the primary audio output device to:

during a final frame of the particular frame cycle:

receive an inter-device control packet from a second audio output device that is paired with the primary audio output device, the inter-device control packet including indications of user-initiated commands received via the second audio output device; and     transmit a second uplink control packet to the audio source device, the second uplink control packet including information derived from the indications of the inter-device control packet.

\* \* \* \* \*